(12) United States Patent
Soerensen

(10) Patent No.: US 11,239,645 B2
(45) Date of Patent: Feb. 1, 2022

(54) CABLE HANG-OFF ARRANGEMENT

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 61 days.

(21) Appl. No.: 16/491,757

(22) PCT Filed: Nov. 29, 2017

(86) PCT No.: PCT/EP2017/080738
§ 371 (c)(1),
(2) Date: Sep. 6, 2019

(87) PCT Pub. No.: WO2018/162103
PCT Pub. Date: Sep. 13, 2018

(65) Prior Publication Data
US 2021/0143625 A1    May 13, 2021

(30) Foreign Application Priority Data

Mar. 9, 2017   (DE) .................. 10 2017 203 897.7

(51) Int. Cl.
*H02G 1/08*    (2006.01)
*H02G 9/02*    (2006.01)
(Continued)

(52) U.S. Cl.
CPC .............. *H02G 9/02* (2013.01); *H02G 1/086* (2013.01); *H02G 1/10* (2013.01); *E02B 2017/0095* (2013.01)

(58) Field of Classification Search
CPC .... E02B 2017/0095; H02G 1/10; H02G 9/02; H02G 15/14; H02G 1/086; E21B 43/0107
See application file for complete search history.

(56) References Cited

U.S. PATENT DOCUMENTS 6,364,677 B1 *   4/2002   Nysveen .............. H02G 15/22
                                                 439/199
8,668,406 B2 *   3/2014   Vidal ..................... F16L 1/123
                                                 405/171
(Continued)

FOREIGN PATENT DOCUMENTS

CN         1548993 A     11/2004
CN       101630826 A      1/2010
(Continued)

OTHER PUBLICATIONS

Office Action in corresponding Chinese Patent Application No. 201780090602.2 dated Jun. 1, 2020. 8 pages.
(Continued)

*Primary Examiner* — Carib A Oquendo
(74) *Attorney, Agent, or Firm* — Schmeiser, Olsen & Watts, LLP

(57) ABSTRACT

Provided is a cable hang-off arrangement configured for mounting at the level of an elevated platform of an offshore facility and includes a pipe configured to accommodate a number of protective tubes, wherein a protective tube is configured to accommodate a transmission cable of the offshore facility; a tube end flange arranged around an end portion of each protective tube; and a hang-off terminator configured for mounting at an end of the pipe, which hang-off terminator includes an end-plate with a number of apertures for the transmission cables, and a flange connection interface for connecting to the tube end flanges. An offshore facility, and a method of securing a transmission cable arrangement at the level of an elevated platform of an offshore facility are also provided.

13 Claims, 4 Drawing Sheets

(51) Int. Cl.
*H02G 1/10* (2006.01)
*E02B 17/00* (2006.01)

(56) References Cited

U.S. PATENT DOCUMENTS

| | | | |
|---|---|---|---|
| 9,377,009 B2* | 6/2016 | Moeller | F03D 9/257 |
| 9,742,179 B2* | 8/2017 | Warren | F16L 33/24 |
| 2005/0247829 A1 | 11/2005 | Low et al. | |
| 2011/0147047 A1* | 6/2011 | Madden | F16L 9/19 |
| | | | 174/126.1 |
| 2012/0234597 A1* | 9/2012 | Madden | H02G 15/076 |
| | | | 174/74 R |
| 2014/0037384 A1 | 2/2014 | Jesper | |
| 2015/0003916 A1* | 1/2015 | Rico Rubio | H02G 1/10 |
| | | | 405/173 |
| 2015/0041171 A1 | 2/2015 | Heggdal | |
| 2017/0007768 A1 | 1/2017 | Haitsuka et al. | |
| 2017/0077687 A1 | 3/2017 | Soerensen | |
| 2020/0032474 A1 | 1/2020 | Soerensen | |

FOREIGN PATENT DOCUMENTS

| | | |
|---|---|---|
| CN | 103574162 A | 2/2014 |
| CN | 110582910 A | 12/2019 |
| DE | 102008028476 A1 | 12/2009 |
| DE | 102012016670 A1 | 3/2014 |
| DE | 102014206000 A1 | 10/2015 |
| EP | 0871909 B1 | 5/2008 |
| EP | 2863053 A1 | 4/2015 |
| EP | 3086424 A1 | 10/2016 |
| GB | 2473058 A | 3/2011 |
| GB | 2473733 A | 3/2011 |
| WO | 0243214 A2 | 5/2002 |
| WO | WO 0243214 A2 | 5/2002 |
| WO | 2016134176 A1 | 8/2016 |
| WO | WO 2016134176 A1 | 8/2016 |
| WO | 2017008988 A1 | 1/2017 |
| WO | WO 2017008988 A1 | 1/2017 |
| WO | 2018046205 A1 | 3/2018 |
| WO | WO 2018046205 A1 | 3/2018 |

OTHER PUBLICATIONS

Worzyk Thomas: "Submarine Power Cables";. Heidelberg: Springer 2009; pp. 118,119; ISBN 978-3-642-01269-3.
International Search Report dated Mar. 22, 2018 for Application No. PCT/EP2017/080738.
Notification to Grant in related Chinese Patent Application No. 201780090602.2 dated Aug. 24, 2021. 7 pages.

* cited by examiner

CABLE HANG-OFF ARRANGEMENT

CROSS-REFERENCE TO RELATED APPLICATIONS

This application claims priority to PCT Application No. PCT/EP2017/080738, having a filing date of Nov. 29, 2017, based off of German Application No. 10 2017 203 897.7 having a filing date of Mar. 9, 2017, the entire contents both of which are hereby incorporated by reference.

FIELD OF TECHNOLOGY

The following describe a cable hang-off arrangement configured for mounting at the level of an elevated platform of an offshore facility. An offshore facility, and a method of securing a transmission cable arrangement at the level of an elevated platform of an offshore facility is also provided.

BACKGROUND

An offshore installation or offshore facility such as a wind turbine, an electrical sub-station, an oil or gas drilling installation etc., is generally mounted on a support structure and requires a transmission link to an on-shore connection point and/or to another offshore facility. Usually, most of the transmission link between two such facilities rests on the seabed. A transmission link can comprise a number of power cables as well as communication cables arranged in number of tubes or hoses. These are generally armoured to protect against damage since the transmission link is generally exposed on the seabed or only buried to a shallow depth. Cables of the transmission link must descend from the level of the elevated platform (carrying the offshore facility) to the level of the seabed. To this end, the transmission cables are usually suspended from the elevated platform and descend essentially vertically to the level of the seabed. It is essential to prevent damage to the cables of the transmission link. Some protection can be given by using armoured pipes or hoses to protect the transmission cables. In one approach, the transmission cables are suspended vertically from the elevated platform within such an armoured pipe or hose, using a mesh stocking to counteract the weight of the cables and to relieve the cables of any strain. Armouring can be realised as a metal mesh or weave embedded in the body of a protective pipe or tube. The weight of the armoured pipes and their cumbersome handling require significant effort when mounting or connecting them at the level of an elevated platform. Such armoured pipes are generally heavy and very inflexible. One of the disadvantages of these known arrangements is that it is not always practicable to arrange one or more transmission cable arrangements vertically from an elevated platform, since this requires provision of a suitable opening in the platform. However, arranging the transmission cable arrangements to exit the elevated platform from the side is also associated with problems, since the weight of an armoured pipe or hose may result in denting or cracking when the pipe or hose rests on a sharp edge (e.g. the edge of the platform), and damage to one or more of the transmission cables may result.

SUMMARY

An aspect relates to an improved way of supporting transmission cables of an offshore facility.

According to the embodiments of the invention, the cable hang-off arrangement is realised for mounting at the level of an elevated platform of an offshore facility and comprises a rigid pipe realized to accommodate a number of protective tubes, wherein a protective tube is realized to accommodate a transmission cable of the offshore facility; a tube end flange arranged around an end portion of each protective tube; and a hang-off terminator realised for mounting at an end of the pipe, which hang-off terminator comprises an end-plate with a number of apertures for the transmission cables, and a flange connection interface for connecting to the tube end flanges. The end-plate may also be referred to as the aperture plate in the following.

An advantage of the inventive cable hang-off arrangement is that it is possible to arrange the transmission cable arrangement to leave the offshore facility either vertically or horizontally ("sideways"). The cable hang-off arrangement with the enclosed protective tubes and the hang-off terminator can be mounted to the elevated platform in advance, and the transmission cables can subsequently be loaded or installed into the protective tubes. The inventive cable hang-off arrangement makes it easier to perform the steps of installing the transmission cables. Furthermore, the use of the rigid outer pipe—which can be made of a strong material such as steel—means that the protective tubes (contained inside the rigid pipe) can be simple un-armoured tubes or hoses. For example, a protective tube can be made of a light and flexible material such as high-density polyethylene (HDPE). Such an un-armoured tube is favourably cheap, and much lighter and easier to handle than an armoured pipe with similar dimensions.

The inventive method of securing a transmission cable arrangement at the level of an elevated platform of an offshore facility comprises the steps of providing an embodiment of the inventive cable hang-off arrangement; arranging a number of protective tubes inside the pipe of the cable hang-off arrangement; arranging a tube flange around an end portion of each protective tube; mounting the hang-off terminator at the end of the pipe; mounting the cable hang-off arrangement to the elevated platform; and inserting a transmission cable into each of a number of the protective tubes.

The inventive method is straightforward to carry out, and it is relatively easy to load transmission cables into the already installed protective tubes inside the pipe.

Particularly advantageous embodiments and features of the invention are given by the dependent claims, as revealed in the following description. Features of different claim categories may be combined as appropriate to give further embodiments not described herein.

In the following, without restricting the embodiments of the invention in any way, it may be assumed that the elevated platform is the transition piece of an offshore facility such as a wind turbine. In the case of an offshore wind turbine, the elevated platform or transition piece may also be referred to as a tower foundation platform. The elevated platform can rest on a support structure such as a jacket structure, a monopile, a gravity foundation or even a floating structure.

A transmission cable can be a power cable, for example one of three AC phase cables of an AC transmission link, or one of two DC cables of a high-voltage DC transmission link. Such a cable is generally relatively thick with a copper core enclosed in one or more layers of protective mantles. A transmission cable may also be a data communications cable, for example for exchanging control information between an offshore facility and an onshore controller. A data communications cable can be realised as a fibre-optic cable, a co-axial cable, etc. and is also usually enclosed in a protective mantle. An offshore facility such as a wind turbine will generally require several power cables as well as one or more data communications cables. These are referred to collectively as a "transmission cable arrangement" or "transmission link".

In a preferred embodiment of the invention, the cable hang-off arrangement comprises a curved upper section that completes a transition from the horizontal to the vertical, so that the transmission cable arrangements can leave the offshore facility from the side, and can be brought into a vertical orientation (towards the seabed) through the curved section of the cable hang-off arrangement. The cable hang-off arrangement can comprise a horizontal section that leads from the offshore facility to the curved section. The cable hang-off arrangement can also comprise a vertical section that continues from the curved section in the direction of the seabed.

The inventive cable hang-off arrangement is preferably securely connected in some way to the elevated platform or transition piece. In a preferred embodiment of the invention, the hang-off terminator comprises a mounting interface realised for mounting to some suitable part of the transition piece. For example, in a preferred embodiment, the pipe end can extend through a suitable opening in a wall or floor of the transition piece, and can comprise a mounting interface so that the hang-off terminator can be bolted in place around that opening.

The protective tubes are preferably already installed in the pipe when the cable hang-off arrangement is being mounted to the transition piece. The number of protective tubes to be loaded into the pipe will depend on the function of the offshore facility. For example, three protective tubes may be needed for the transmission link of an AC power generation plant such as an offshore wind turbine; two protective tubes may be sufficient for a DC transmission link of a DC power generation plant. An additional protective tube may be needed to contain data communication cables. The empty or hollow protective tubes are loaded or installed into the pipe of the cable hang-off arrangement, and the ends of the protective tubes may align with the end of the pipe, or may protrude some distance out from the end of the pipe.

The end-plate serves to close the assembly at the hang-off terminator. In a preferred embodiment of the invention, the end-plate is realised in two parts, preferably two coplanar parts, wherein a first part comprises an arrangement of a number of aperture halves and the second part comprises a complementary arrangement of aperture halves. These two halves can be brought into position about the protective tubes, and joined together to form a complete end-plate. The apertures align with end openings of the protective tubes. An aperture can correspond to the opening of a single protective tube; alternatively an aperture can align with the end openings of more than one protective tube.

In a preferred embodiment of the invention, the end-plate comprises apertures for three power cables of an AC transmission link. This end-plate may also comprise a further aperture for a data cable. In another preferred embodiment of the invention, the end-plate comprises apertures for two power cables of a high-voltage DC (HVDC) transmission link. This end-plate may also comprise a further aperture for a data cable. The apertures may be arranged in any suitable configuration, for example in a linear configuration.

The end-plate serves to secure the tube end flanges at the hang-off terminator. To this end, each tube end flange and the end-plate may comprise matching through-holes to accommodate fasteners such as bolts. Threaded bushings can be provided to avoid the need to use nuts.

A tube end flange preferably comprises a cylindrical portion that fits snugly over the end of the protective tube in the manner of a cuff or sleeve, or a cylindrical portion that fits snugly into the end of the protective tube. A tube end flange is preferably very securely mounted to a protective tube. For example, a tube end flange may be mounted to the end of a protective tube by gluing, screwing, bolting, or clamping it into place. A combination of such means may be used in order to achieve a sufficiently robust connection, ensuring that the protective tube will not slip out of or off the tube-end flange.

In a preferred embodiment of the invention, the pipe comprises a flange, preferably an outer flange, at its end. This flange can be wide enough to serve as a mounting means to the end-plate, and may also serve as a mounting means to the transition piece. Preferably, the dimensions of the end-plate correspond to the dimensions of the pipe end flange. In the case of a pipe with a circular cross-section, the diameter of the outer flange preferably exceeds the diameter of the pipe by a sufficient amount to permit the provision of a mounting interface.

In a preferred embodiment of the invention, the inventive cable hang-off arrangement is preferably realised for use with fluid-cooled transmission cables. A fluid-cooled transmission cable generally comprises a protective tube with enough space to accommodate a power cable as well as a fluid coolant. The gaps between power cable and protective tube at the outer ends of the protective tube are closed to contain the fluid coolant. To this end, an annular water-tight seal is preferably arranged between a power cable and a protective tube.

The inventive method preferably comprises a step of providing a protective tube with a fluid injection arrangement. For example, a fluid injection opening can be formed in the protective tube near the outer end. A sleeve with a fluid injection nozzle can be arranged around the end portion of the protective tube to align with the fluid injection opening. This fluid injection arrangement can be used to pump a cooling fluid into the annular space between the protective tube and the power cable after installation of the power cable. Alternatively, in a preferred embodiment of the invention, a fluid can be pumped into the protective tube through the fluid injection nozzle to assist in the step of installing the power cable. To this end, a "pig" or other suitable device (with the same diameter as the inside diameter of the protective tube) can be secured to the lead end of the power cable so that when fluid is pumped under pressure in through the fluid injection nozzle, the pig is pushed forward through the protective tube, pulling the power cable behind it. In this way, the power cable can be installed relatively easily into the protective tube, and at the same time the annular space between protective tube and power cable is filled with water which will later serve to cool the hot power cable.

To facilitate the power cable installation step described above, it may be advantageous to have the ends of the protective tube protrude some distance beyond the end of the pipe. This allows access to the fluid injection nozzles. After power cable installation, the protective tubes will be fluid filled and therefore heavy, so that their positions relative to the pipe are essentially fixed. Therefore, in a preferred embodiment of the invention, the cable hang-off arrangement comprises a pipe extension portion or pipe adapter portion, realised for mounting between the pipe end flange and the end-plate. This adapter portion can be in the form of two cylinder halves that can be brought into position around the protruding ends of the protective tubes, and then bolted or otherwise joined together. Preferably, the pipe adapter portion comprises a flange or other connection means for mounting to the end of the pipe. Similarly, the pipe adapter portion preferably comprises a flange or other connection means for mounting to the aperture plate.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
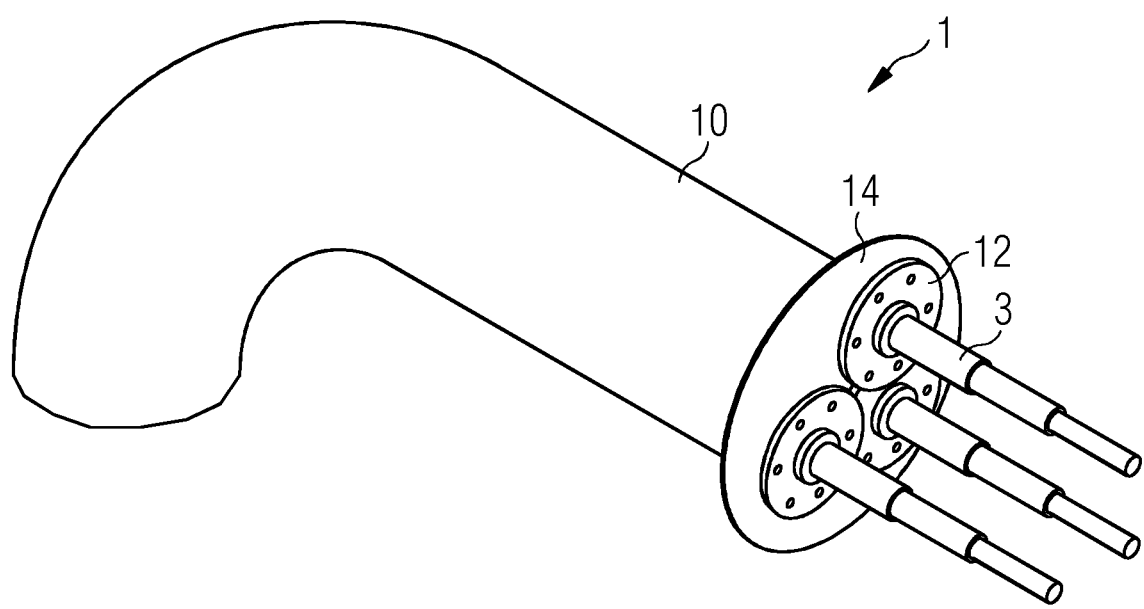
FIG. 1 shows part of an embodiment of a cable hang-off arrangement.

FIG. 1 shows a cable hang-off arrangement 1 realised for mounting at the level of an elevated platform of an offshore facility. The cable hang-off arrangement 1 comprises a pipe 10 that is large enough to accommodate several protective tubes of a transmission cable arrangement of the offshore facility. Each tube (not visible in the diagram) is loaded with a power cable, and diagram shows three power cables 3 emerging from the cable hang-off arrangement 1. Each power cable 3 is held in place by a tube-end flange 12 that is secured to an end-plate 14 of the cable hang-off arrangement 1.

Figure 2:
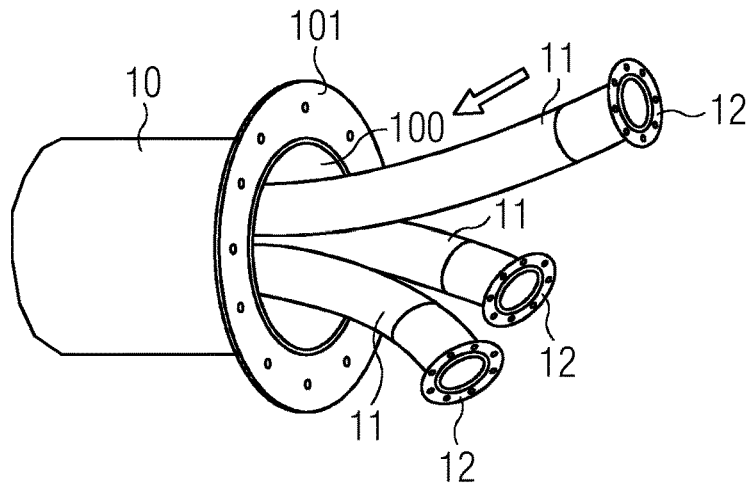
FIG. 2 illustrates a step of a method.

FIG. 2 shows a pipe 10 being loaded with a number of protective tubes 11, as indicated by the arrow. Here, the protective tubes are HDPE tubes that are lightweight, flexible, and easy to handle. A tube-end flange 12 is fastened at the end of each protective tube 11, for example by clamping, gluing, etc., so that the protective tube 11 cannot slip out of the tube-end flange 12. In this exemplary embodiment, each tube-end flange 12 has a cylindrical sleeve that fits snugly about the end of a protective tube 11. The protective tubes 11 are inserted into the pipe 10 so that the tube-end flanges 12 are essentially flush with the open end face 100 of the pipe 10.

Figure 3:
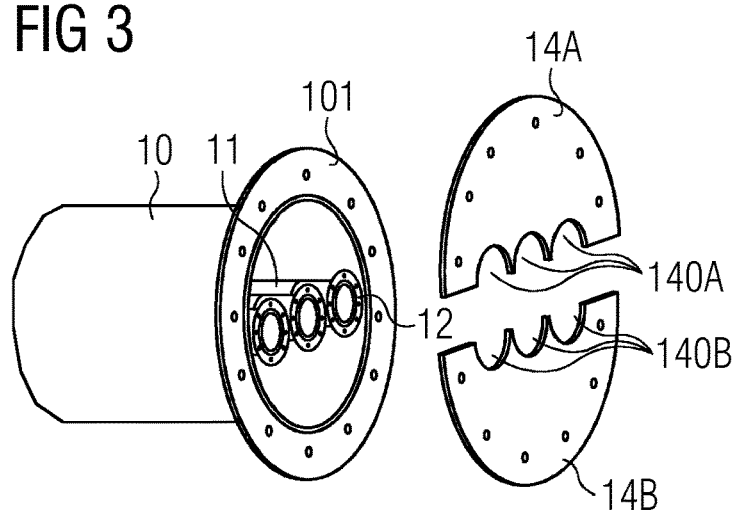
FIG. 3 illustrates a further step of the method.

FIG. 3 shows a two-part end-plate 14 or aperture plate 14 being brought into place about the protective tubes 11. Each half 14A, 14B of the aperture plate 14 has a number of aperture halves 140A, 140B that together form the apertures 140 which fit about the cylindrical sleeves of the tube-end flanges 12. The flange portions of the tube-end flanges 12 may overlap at the outside of the aperture plate 14. Matching bushings 144 in the aperture plate 14 and tube-end flanges 12 allow the tube-end flanges 12 to be bolted or otherwise secured to the aperture plate 14. In this way, the protective tubes 11 are securely held in place at the aperture plate 14.

Figure 4:
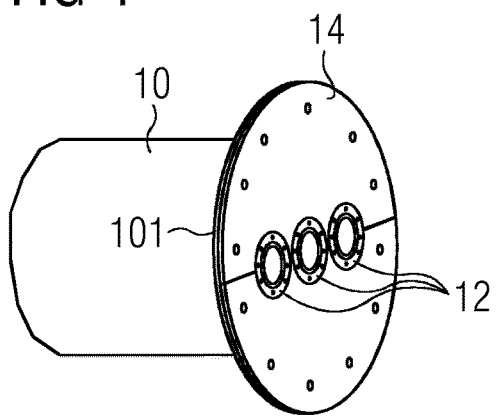
FIG. 4 shows part of another embodiment of the cable hang-off arrangement.

FIG. 4 shows the aperture plate 14 in place at the end of the pipe 10. Here, the aperture plate 14 and an outer pipe end flange 101 comprise matching bushings, so that the aperture plate 14 and pipe end flange 101 can be bolted together. In this embodiment, the hang-off terminator is formed by the tube-end flanges 12, the aperture plate 14 and the pipe end flange 101. Later, the power cables 3 will be installed through the apertures 140 of the aperture plate 14.

Figure 5:
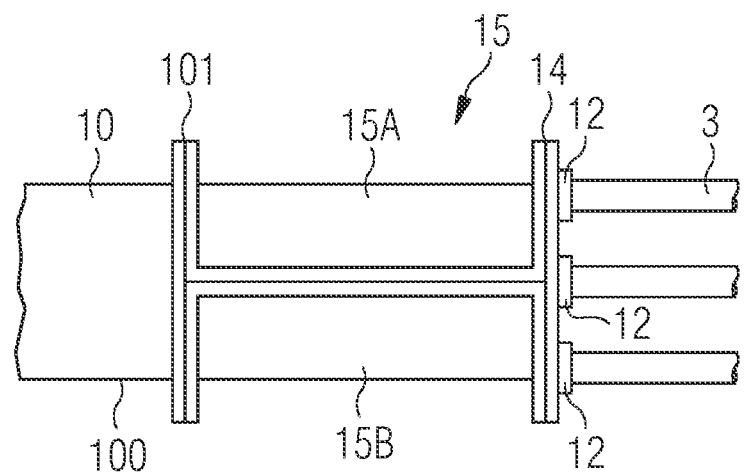
FIG. 5 shows part of another embodiment of the cable hang-off arrangement.

FIG. 5 shows an alternative embodiment of the inventive cable hang-off arrangement 1. Here, the hang-off terminator includes an adapter cylinder 15, which is made of two half cylinders 15A, 15B joined together. The adapter cylinder 15 allows the protective tubes 11 to extend some distance from the end 100 of the pipe 10. One end of the adapter cylinder 15 is secured to the pipe end flange 101. The aperture plate 12 is secured to the other end of the adapter cylinder 15. Transmission cables 3 are installed through apertures of the aperture plate 14 and secured by tube-end flanges 12.

Figure 6:
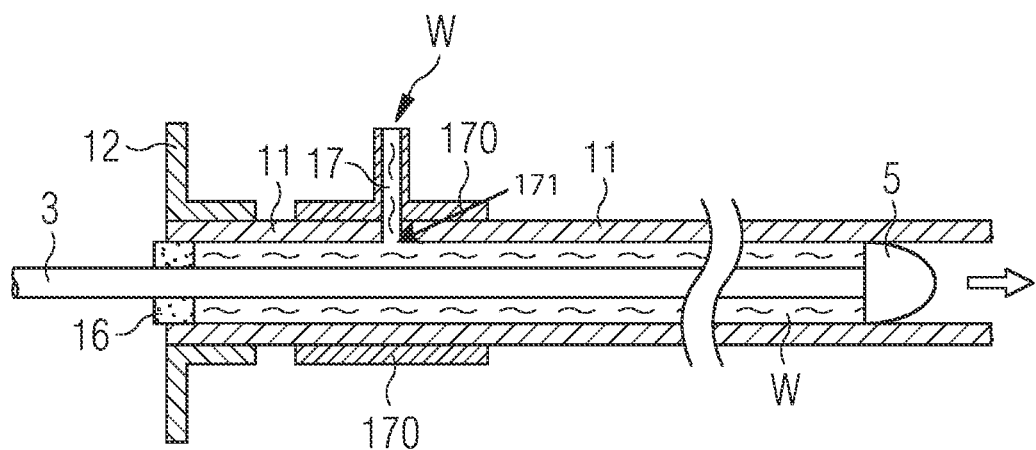
FIG. 6 illustrates a further stage in an embodiment of the method.

FIG. 6 shows a step in one embodiment of the inventive method. A pig 5 is secured to a lead end of a power cable 3 being installed in a protective tube 11. Here, a fluid injection arrangement 17, 170, 171 is provided at the end of each protective tube 11, and comprises a sleeve 170 securely mounted over the end of the protective tube 11. A fluid injection nozzle 17 is aligned with an opening 171 in the protective tube 11. Water can be pumped in under pressure through the fluid injection nozzle 17 into the protective tube 11. The pressurized water W forces the pig 5 along through the protective tube 11, puling the power cable 3 along behind it. After installation is complete, the water W in the protective tube 11 acts to cool the power cable 3 when this becomes hot. The arrangement of FIG. 5 allows the protective tubes 11 to extend beyond the end 100 of the pipe 10 for easy access to the fluid injection arrangement 17, 170, 171 during the cable installation step. Thereafter, the exposed ends of the protective tubes 11 are covered by the adapter cylinder 15, which can also serve to secure the cable hang-off arrangement 1 to the transition piece.

Figure 7:
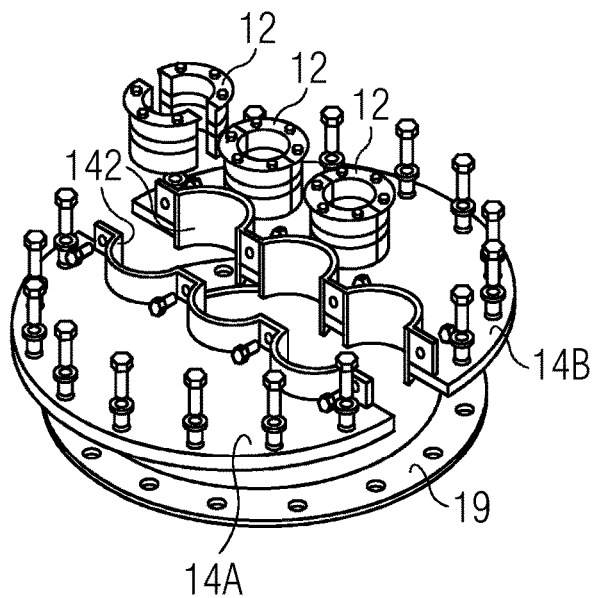
FIG. 7 shows part an aperture plate for use in an embodiment of the cable hang-off arrangement.
Figure 8:
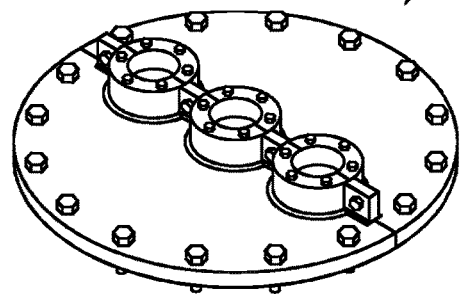
FIG. 8 shows the aperture plate of FIG. 7.

FIG. 7 shows an alternative to the aperture plate described in FIGS. 3 and 4 above, which can be used with a different type of tube end flange than that described above. Here, the aperture plate 14 includes a two-part cuff arrangement 142 that securely fits around the cuffs of tube-end flanges 12. The aperture plate 14 is made of two halves 14A, 14B that fit around a linear arrangement of three protective tubes 11 as described above. Of course, the aperture plate halves 14A, 14B could be designed to fit around a linear arrangement of two protective tubes, four protective tubes, etc., or to fit around a non-linear arrangement of protective tubes. When assembled around the protective tubes, the aperture plate 14 presents a closed face as shown in FIG. 8. The aperture plate 14 can be mounted to an end flange of the pipe 10 or to an end flange of an adapter cylinder by means of fasteners inserted through bushings 143 as shown. A gasket 19 can be included to achieve a water-tight connection, for example if the pipe is to be filled with water to provide water cooling and/or buoyancy to the pipes.

Figure 9:
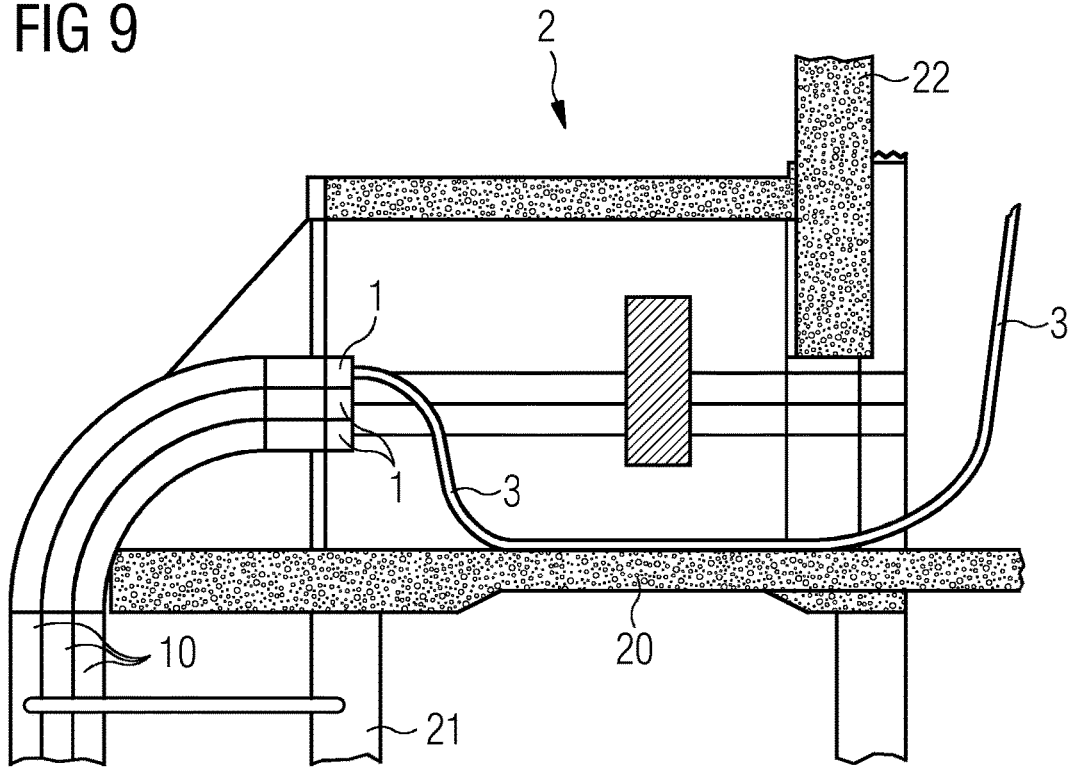
FIG. 9 shows an embodiment of the offshore installation.

FIG. 9 shows an embodiment of the inventive offshore facility 2, in this case an offshore wind turbine 2, showing a transition piece 20 between a wind turbine tower 22 and a supporting structure 21. The inventive cable hang-off arrangement 1 is used to as an economical and robust means of leading the transmission cables of the wind turbine 2 from the transition piece 20 down towards the seabed (not shown). The diagram shows how the cable hang-off arrangement 1 might be secured to the transition piece 20, in this case by mounting the pipes 10 of a cable hang-off arrangement 1 through an opening in a side wall of the transition piece 20.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A cable hang-off arrangement configured for mounting at a level of an elevated platform of an offshore facility, the cable hang-off arrangement comprising:
    a pipe configured to accommodate a plurality of protective tubes, wherein each protective tube is configured to accommodate a transmission cable of the offshore facility;
    a tube end flange arranged around an end portion of each protective tube; and
    a hang-off terminator configured for mounting at an end of the pipe, wherein the hang-off terminator comprises an end-plate with a plurality of apertures for the transmission cables, and a flange connection interface for connecting to the tube end flanges;
    wherein the end-plate has two parts, and wherein a first part comprises an arrangement of a plurality of aperture halves and a second part comprises a complementary arrangement of aperture halves.

2. The cable hang-off arrangement according to claim 1, wherein the end-plate comprises apertures for three transmission cables of an AC transmission link.

3. The cable hang-off arrangement according to claim 1, wherein the end-plate comprises apertures for two transmission cables of a DC transmission link.

4. The cable hang-off arrangement according to claim 1, wherein the pipe comprises a flange at an end of the pipe, further wherein dimensions of the end-plate are based on dimensions of the flange.

5. The cable hang-off arrangement according to claim 4, wherein the end-plate is secured to the flange.

6. The cable hang-off arrangement according to claim 1, further comprising a pipe extension portion, the pipe extension portion configured for mounting between a pipe end flange and the end-plate.

7. The cable hang-off arrangement according to claim 1, comprising a water-tight seal between a tube end flange and the transmission cable.

8. The cable hang-off arrangement according to claim 1, wherein the end-plate comprises a linear arrangement of apertures extending along a diameter of the end-plate.

9. The cable hang-off arrangement according to claim 1, wherein the hang-off terminator comprises a mounting interface configured for mounting to the elevated platform of the offshore facility.

10. An offshore facility comprising
    an elevated platform arranged on a supporting structure; and
    the cable hang-off arrangement according to claim 1.

11. A method of securing a transmission cable arrangement at a level of an elevated platform of an offshore facility, the method comprising:
    providing the cable hang-off arrangement according to claim 1;
    arranging a plurality of protective tubes inside the pipe of the cable hang-off arrangement;
    arranging a tube flange around an end portion of each protective tube;
    mounting the hang-off terminator at an end of the pipe;
    mounting the cable hang-off arrangement to the elevated platform; and
    inserting a transmission cable into each of the plurality of the protective tubes.

12. The method according to claim 11, comprising a step of providing a protective tube with a fluid injection arrangement.

13. The method according to claim 11, wherein the step of inserting a transmission cable into a protective tube comprises pumping a fluid into the protective tube.

* * * * *